Barnard & Jordan,
Fan Blower.

№ 25,554.  Patented Sept. 27, 1859.

Witnesses;
Calvin H. Carter
Stephen W. Kellogg

Inventor
Wm. B. Barnard
Edmund Jordan

UNITED STATES PATENT OFFICE.

WM. B. BARNARD AND E. JORDAN, OF WATERBURY, CONNECTICUT.

ROTARY BLOWER.

Specification of Letters Patent No. 25,554, dated September 27, 1859.

*To all whom it may concern:*

Be it known that we, WILLIAM B. BARNARD and EDMUND JORDAN, of Waterbury, in the county of New Haven and State of Connecticut, have invented, made, and applied to use certain new and useful Improvements in Rotary Blowers, which we term the "Double - Propeller Diaphragm - Blower;" and we do hereby declare that the following is a full, clear, and exact description of the construction and operation of the same, reference being had to the annexed drawing, making part of this specification, wherein—

Figure 2:
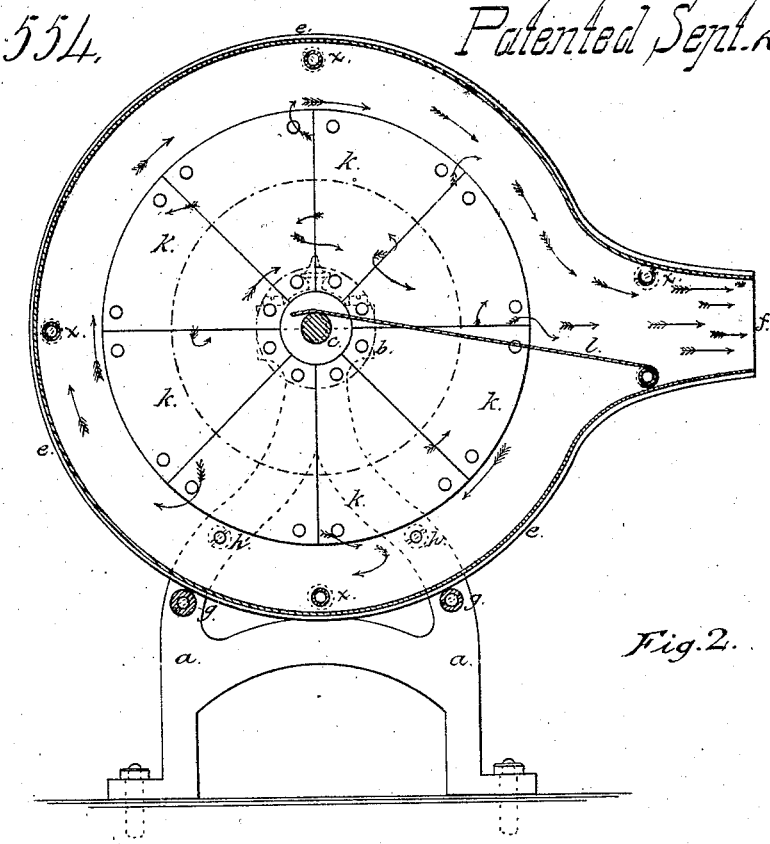
Figure 1:
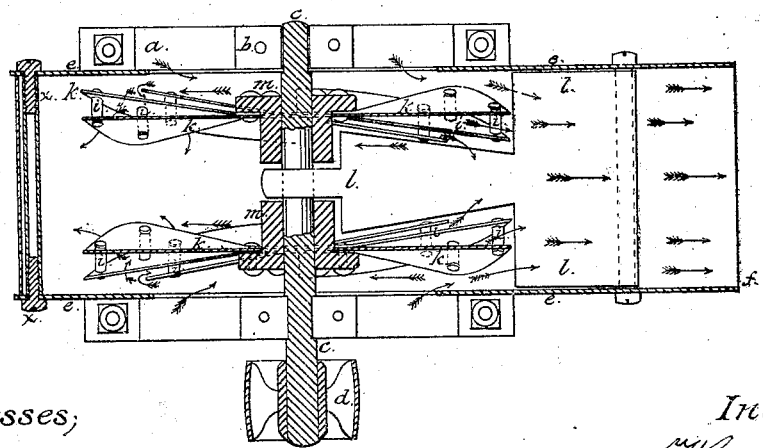

Figure 1 is a sectional plan and Fig. 2 is a side elevation of our said double propeller diaphragm blower.

Similar marks of reference denote the same parts.

Our said invention consists in the combination of double propeller fans with an intervening diaphragm, applied within the case of the blower in such a manner that the said propellers in being rotated cause the air to pass through between the diagonal blades into the intervening space, and the aforesaid diaphragm standing across this space at the line of the blowers mouth causes the air that would otherwise be carried around between these double propellers, to be deflected off through the mouth and trunk of the blower; our invention is thus distinguished from those blowers in which the air is driven off by centrifugal force only, and from those in which the diagonal position of the fan or propeller is the motive force applied to the air. We also mount our blower in such a manner that its case can be turned around to bring the mouth horizontal, inclined or vertical, without changing the position of the standards by which it is attached and sustained, and preserving the central position of the blower in the case.

In the drawing $a\ a$ are standards attached to any suitable support in either a horizontal vertical or inclined position. $b, b$, are boxes on said standards receiving the blower shaft $c$, that is driven in the direction of the red arrows by competent power applied to the pulley $d$.

The sides of the blower case $e$, are formed circular except where the mouth $f$, passes off to the pipe or trunk conveying the air from the blower to the fire, and $x, x$, are tie bolts or columns connecting the sides $e, e$, to each other, and confining the bent plate that is between said sides and completes the blower case.

$g, g$, are columns between the frames $a, a$, or projecting flanges therefrom, at a distance from the center of the shaft $c$, corresponding to the radius of the blower case $e$, hence said circular blower case resting on these supports $g, g$ can be turned around into any desired position to bring the mouth $f$ in the proper direction and the case be in position relatively with the shaft $c$.

$h, h$ are bolts passing through the standards $a, a$, into, or pressing onto, the blower case $e, e$, to hold it in position when set.

$k, k$, are the double propellers attached to the shaft $c$, by the flanges $m, m$, and the fans of said propellers stand in reverse inclined directions on the respective sides as seen in Fig. 1, so that the revolution of said fans in the direction of the red arrows causes the air to be forced by said inclined fans into the space between them, and the centrifugal force also throws the air off into the case $e$. The respective inclined fans ($k\ k$) are made to lap about half way onto each other, and are connected together by the studs or braces $i, i$, thereby forming a series of mouths through which the air is forced in the direction of the black arrows as said propellers, formed by these inclined fans, revolve.

$l$, is a diaphragm formed of such a shape as to set closely to the parts, but allow the propellers to revolve without coming in contact therewith, and said diaphragm extends from the mouth $f$ to the shaft $c$, so as to cause all air that is forced into the space between the propellers or revolved around with the same, to be deflected through the mouth. Thus our blower will give a larger blast of air with less power and at a less speed than any blower with which we are acquainted.

Having thus described our said invention what we claim and desire to secure by Letters Patent is—

The diaphragm $l$, in combination with the revolving propeller or propellers $k$, to deflect the blast to the mouth or opening $f$, as the blower revolves in the case ($e$) substantially as set forth.

In witness whereof we have hereunto set our signatures this ninth day of July 1859.

WM. B. BARNARD.
EDMUND JORDAN.

Witnesses:
STEPHEN W. KELLOGG,
CALVIN H. CARTER.